Jan. 19, 1965  P. W. THOMPSON ETAL  3,165,816
METHOD OF MANUFACTURING DYNAMOELECTRIC MACHINES
Original Filed Nov. 4, 1958  2 Sheets-Sheet 1
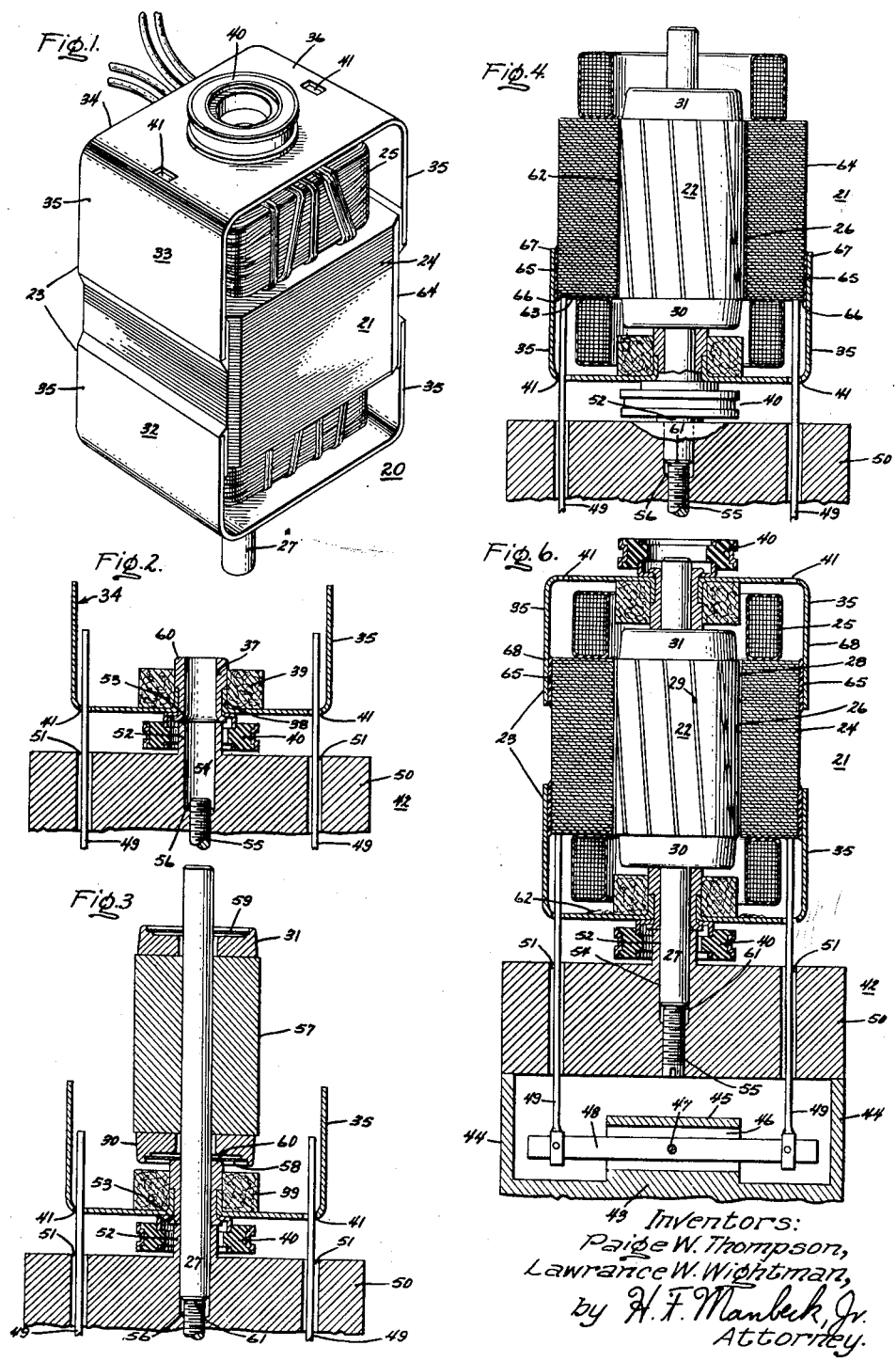
Inventors:
Paige W. Thompson,
Lawrance W. Wightman,
by H. F. Manbeck, Jr.
Attorney.

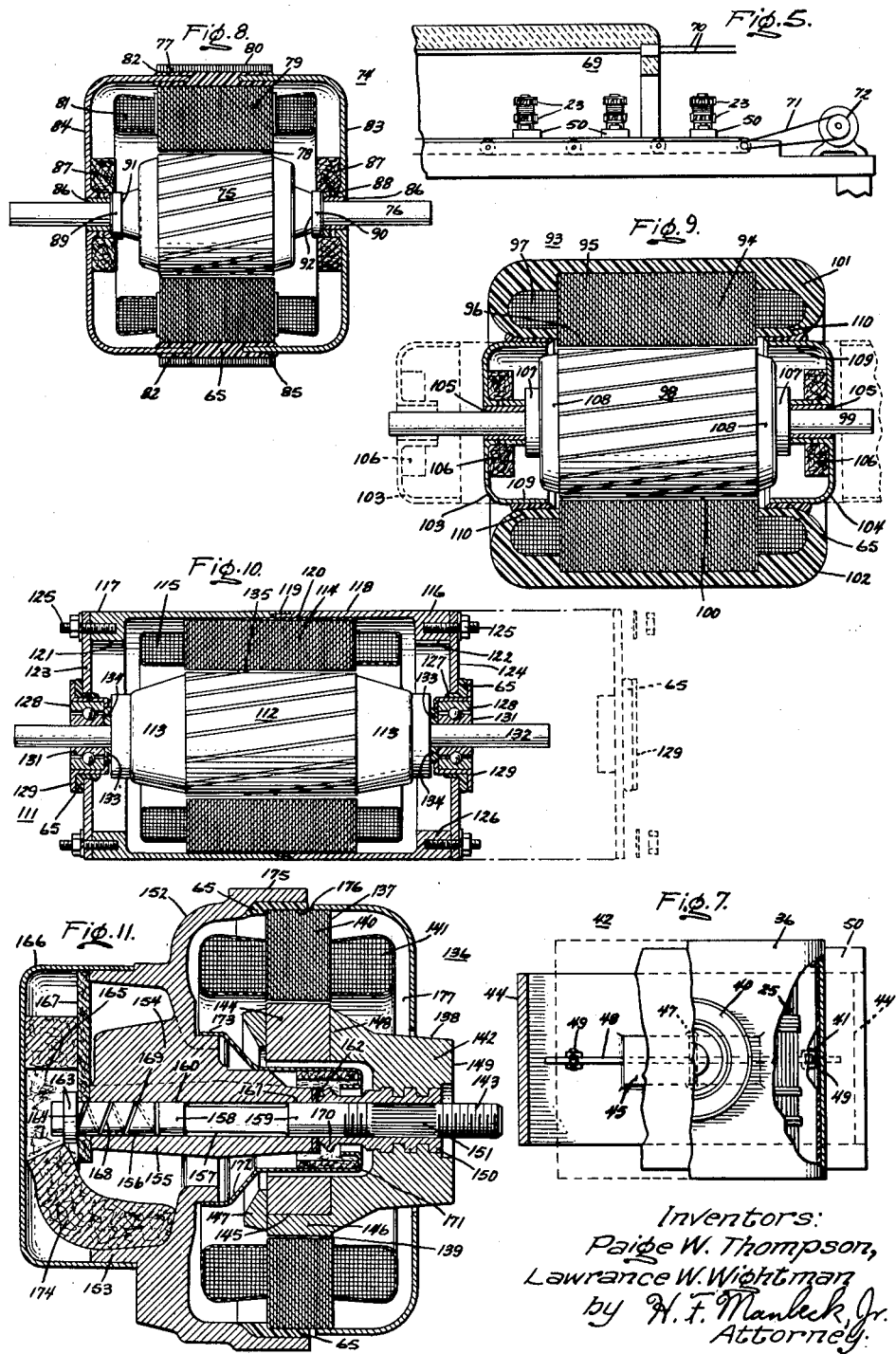

United States Patent Office 3,165,816
Patented Jan. 19, 1965

3,165,816
METHOD OF MANUFACTURING DYNAMO-
ELECTRIC MACHINES
Paige W. Thompson, Morrison, Ill., and Lawrance W.
Wightman, St. Louis, Mo., assignors to General Electric
Company, a corporation of New York
Original application Nov. 4, 1958, Ser. No. 771,755.
Divided and this application Dec. 30, 1960, Ser. No.
79,665
9 Claims. (Cl. 29—155.5)

The present application is a division of our application Serial No. 771,755, filed November 4, 1958 and assigned to the assignee of the instant application.

This invention relates to dynamoelectric machines, more particularly to an improved method of manufacturing and assembling small and fractional horsepower machines.

As is well known in the electric motor and generator field, each dynamoelectric machine generally includes a stationary member, commonly referred to as a stator, concentrically arranged relative to a rotatable member called a rotor, with the rotor being separated from the stator by an annular air gap. The operation of such machines is achieved by the establishment of a magnetic flux field across the air gap between the stator and rotor members. The strength and effectiveness of this field is controlled to a great extent by the dimensions of the air gap; that is, as the radial width of the air gap is decreased, less magnetic material and exciting coils are required to produce a given field strength and machine performance. Therefore, it is very desirable to maintain the radial width of the air gap at a small value without any interference betwen the rotor and stator members during their relative rotation. Furthermore, it is also important that the air gap be of a controlled and uniform width throughout its circumference, for among other reasons, an off-center rotor during machine operation will cause unduly high vibrations, excessive noise, and a marked decrease in machine performance. Moreover misalignment between the rotor shaft and the bearings carrying the rotor assembly will similarly affect the proper operation of the machine, and will cause premature bearing failures.

In addition to the rotor being centered radially in the air gap, it should also be centered axially and its shaft should not move appreciably in the axial direction during rotation. Any excessive amount of axial movement, known as an end play, will detrimentally affect machine operation.

Heretofore, in order to obtain a motor or generator, suitable for mass production purposes, which had the requisite bearing and shaft alignment, accurate rotor and stator concentricity, and proper rotor shaft end play, the manufacturing practices by necessity have been costly, and in many instances have resulted in a machine of relatively complex construction. For example, one method of manufacture necessitated the holding of a large number of dimensions within very close limits. Close tolerances between machine parts were required because of the manner in which the rotor, stator, and rotor bearings were located with respect to each other. For instance, if the stator were bolted to the motor frame, it would be necessary to locate accurately corresponding holes in the stator core and the motor frame with respect to bearing mounts so that the radially inner surface of the stator core would be coaxial with the axis of the bearing and rotor. Thus, the control of the air gap between the stator and the rotor was limited by the dimensional tolerances required for the component parts, from the rotor shaft, radially out to the inside of the housing. These tolerances, being cumulative, placed a practical limitation on the minimum radial width of the air gap, since the air gap width must be sufficient to allow for the dimensional variations of rotors and stators and other component parts of the motor within such manufacturing allowances.

Certain other methods of assembly and the resultant motor constructions were designed to obviate the need for the above-mentioned close tolerances required on the end shields, frames, stator outer diameter, bearing and rotor shaft assembly, etc., but were not entirely satisfactory for one reason or another. For example, one such method provides a means which simulates the rotor and shaft assembly of the electric machine, with the outside diameter of the simulated or dummy rotor portion being larger than the actual rotor by the amount of the air gap. This dummy rotor is initially placed into the rotor bearing means, which are fixedly secured to the frame, in a position simulating the finally assembled position of the rotor and shaft assembly. The wound stator core is thereafter assembled over the dummy rotor and welds are then made between the frame, which fixedly carriers the bearings, and the outer periphery of the stator core by any suitable means. After the welding step has been completed, the dummy rotor is withdrawn, leaving the stator secured in place with provision for a controlled annular air gap. The rotor assembly is thereafter inserted into the stator and frame unit. This method, of course, is suitable only for use with "unit bearing" machines, that is, machines in which the rotor is supported at one end only and, thus is not available for use with the great majority of machines wherein the rotor is supported at both ends. Further, since in this method, the stator core and frame are secured by a weld, stresses are introduced which have an adverse effect, as will be explained hereinafter, particularly in destroying at least to some extent, the bearing alignment obtained before the weld is made.

Yet other manufacturing procedures employing the dummy rotor technique have been proposed for assembling machines in which the rotor is supported at both ends. But in these procedures it is necessary to provide detachable end shield assemblies in order that the dummy rotor can be removed after securement of the various parts and the rotor assembly substituted therefore. In some instances, type-metal casting or the like is used to mechanically secure the various parts together. The machine construction and method of assembly as disclosed in the Soames Patent No. 598,540, now abandoned, is typical of this approach. Generally speaking, initialy the dummy rotor and shaft assembly is arranged within the stator core member. This unit is then positioned within a frame with the outer surface of the stator core member being spaced from the frame. Normally, the frame is formed with a flange against which one side of the stator core member is held; a ring or other means is placed against the other side of the stator member and the member is held therebtween. In addition, the frame and ring member are provided with a plurality of grooves for holding the type-metal, as will be hereinafter explained. Detachable end shield assemblies, each formed with a central boss having a recess within which a shaft bearing is loosely carried, are bolted to the frame after the bearings have been placed onto the shaft. The assembly is then turned on end and molten type-metal is poured into the spaces and grooves between the frame and stator, and between the boss recesses and bearings. The metal is then allowed to set. Thus, it can be seen that the metal fills the spaces and grooves and mechanically links the adjacent parts together. The provision of grooves or other means into which the material may be run, is essential for this mechanical interlock of parts, since type-metal or the like does not have adhesive or bonding characteristics to fixedly hold the adjacent parts in the desired relationship. Thereafter, one end shield assembly is removed and the dummy rotor assembly is replaced by the machine rotor. The end shield is once again bolted to the end of the frame, completing the assembly.

The disadvantages of this procedure and resultant machine construction are manifold. This assembly procedure is adaptable for use only with a detachable end shield type of machine wherein a portion of the machine may be disassembled in order to remove the dummy rotor. Further, the fact that the machine must be partially disassembled and the dummy rotor and shaft assembly replaced by a unit which may have different tolerances, the prior alignment of the parts very often is destroyed and the shaft end play is changed. Tightening of the bolts also has a tendency to change the alignment obtained prior to the removal of the dummy rotor. Moreover the use of type-metal to interlock the parts has not proven to be too satisfactory. For example, the machine structure is more complex than is desired, for the frame must have means to hold the stator therein; e.g., flanges. Also, grooves, and the like must be provided for retaining the metal for mechanical locking purposes. In addition, due to the difficulty experienced in the application of the molten material and the tendency of the material to shrink once it solidifies, a relatively large space must be provided to hold the metal and an excessive amount of metal must be used. Then, too, like welding, due to the fact that metal has a tendency to shrink, stresses are introduced adversely affecting alignment of the parts. Further, not only is the above assembly procedure overly complicated, but also with the use of metal, the parts must be in a relative final position before the molten metal can be applied, a limiting factor in the assembly set up.

As is readily apparent, previous assembly procedures have been costly, both from the standpoint of number and accuracy of operations employed in the mass production manufacture of the motor. Equally important, none of the foregoing methods insured that the motors produced by the mass production processes were continually of a high standard; i.e., each motor provided with a maximum degree of rotor and stator concentricity and proper bearing and shaft alignment. Bolting, clamping, welding, metal mechanical locking or the like of the rotor supporting assembly to the stator frequently created or added undesirable stresses which tended to deform both the stator-rotor concentricity and the bearing alignment after completion of the assembly of the motor. With such stresses present, a readjustment and realignment of the parts takes place, destroying the degree of concentricity and alignment achieved during the prior assembly steps. In some instances, the proper amount of rotor shaft end play was difficult to set. Furthermore, the kind of securing means and the associated motor assembly practices were generally limited in use with one specific type of motor; e.g., unit bearing type.

Accordingly, an object of the invention is the provision of an improved method of assembling dynamoelectric machines, which provides a high degree of air gap control between the rotor and the stator and a high accuracy in bearing alignment, with a minimum of variation from one machine to the next.

Another object is the provision of a novel method of assembling the stator, rotor, and bearing assembly of a machine, whereby the machine may be formed of parts having wide tolerances, yet the machine will be provided with excellent alignment qualities.

A further object is the provision of a machine in which the number of parts are kept at a minimum, and in whose production the assembly operations are substantially reduced.

Yet another object of the invention is to provide an assembly process whereby a predetermined amount of rotor shaft end play may be set in each machine by simple adjustments of assembly fixtures thereby eliminating more complicated setting arrangements.

Still another object is the provision of a process of manufacture which is suitable for use in the assembly of a variety of types of machines, and which will produce improved low-cost machines on each of the types.

Further objects and advantages will become apparent as the following description proceeds and the subject matter which we regard as our invention is pointed out with particularity in the claims annexed to and forming a part of this specification.

In carrying out the objects of this invention in one form thereof, we provide an improved method of manufacturing a dynamoelectric machine in which the stator and rotor assemblies are axially aligned and arranged in spaced relation with removable positioning or spacing means such as shims, positioned between the stator and rotor members of the respective assemblies to maintain them in an accurate and concentric relationship. The rotor supporting means, including the bearings for carrying the rotor and shaft assembly during operation, is loosely assembled adjacent to the stator assembly, with a surface of the rotor supporting means and a surface of the stator assembly being in generally non-supporting and overlapping relation, and with the bearings fitted on the rotor shaft. Bonding means in the form of a structural adhesive material, having substantially no shrinkage, is provided in its unhardened; e.g., plastic, state between the associated overlapping surfaces of the stator assembly and the rotor supporting means. The adhesive material permits unstressed relative angular movement between the overlapping surfaces as the shaft aligns the bearings therewith. Thereafter, the bonding means is hardened or solidified at least to a point where the stator and the rotor supporting means are secured with respect to each other before the spacing means are taken out of the assembly. With the parts thus assembled in the desired relationship, the spacing means are then removed from the air gap to release the stator and the rotor members, leaving them freely rotatable and accurately aligned with respect to each other. Equally as important, the rotor supporting bearings and shaft are left freely rotatable and accurately aligned relative to one another.

In this form of the invention, the rotor and stator members are concentrically maintained until the assembly of the parts is complete so that there can be no question of eccentricity between the respective members. In addition, since the rotor supporting means and the stator are movably maintained relative to one another until the assembly of parts is complete, there is nothing critical about the dimensions of the rotor supporting means and its degree of proximity to the stator assembly. This allowance of wide tolerances of the parts permits the use of inexpensive stamped out parts without affecting the accurate alignment and concentricity of the various assemblies in the completed machine.

Moreover, since the bonding means includes a hardenable structural adhesive material of the type which has little shrinkage, i.e., is substantially non-shrinking between its plastic and solid state, and also in our preferred arrangement, has excellent adhering qualities and is of the thermo-setting type, the motors produced have a uniformly high standard of quality, devoid of stresses which would tend to deform either the alignment of the rotor supporting means with the rotor shaft or the concentricity of the rotor and stator after completion of the assembly process. In addition, the use of a hardenable adhesive material together with the spacing means provide a certainty that an accurately centered air gap will be provided for the operating life of the machine.

The simplicity of the process of assembly of this invention permits a mass production manufacture of a uniformly high quality machine having excellent operating characteristics with a minimum amount of variance be-between machines at a unit cost considerably lower than has been heretofore attained. This is accomplished by the reduction of the number and cost of the individual manufacturing operations while improving the accuracy thereof. Further the process is adaptable for use with a wide variety of motor types, allows the low cost motor parts, such as stamped parts and, as will be later explained, provides for the easy adjustment of the desired amount of rotor and shaft end play during the assembly.

For a better and more complete understanding of the invention, reference should be had to the following description taken in conjunction with the accompanying drawings which illustrate embodiments of the present invention.

In the drawings:

FIG. 1 is a perspective view of an electric motor manufactured by the preferred method of our invention;

FIG. 2 is a partial side view in cross section of an assembly fixture with a motor end shield assembly in position thereon, illustrating one step of the improved method of this invention;

FIG. 3 is a similar view to FIG. 2 showing the next assembly step in the preferred method of the invention, with the rotor assembly placed in the fixture and end shield assembly;

FIG. 4 is a similar view to FIG. 3 illustrating a subsequent step in the method, with the addition of the stator assembly, the shim means between the stator and rotor members and the adhesive bonding material;

FIG. 5 shows the curing step for hardening the bonding material in the assembled electric motors;

FIG. 6 is an axial view, partially in cross-section, of the completed electric motor shown in FIG. 1 after the curing step but prior to removal from the assembly fixture, to illustrate in more detail the assembled electric motor and assembly fixture;

FIG. 7 is a plan view, broken away in part, of the end shield assembly in position on the fixture as shown in FIG. 2, to illustrate more clearly the assembly fixture;

FIG. 8 is an axial view, partially in cross-section, of a second motor which may be manufactured in accordance with the present invention;

FIG. 9 is an axial view, partially in cross section, of a totally enclosed stator encapsulated motor assembled by our improved method of manufacture;

FIG. 10 is an axial view, partially in cross-section, of a detachable end shield motor built by our present invention; and FIG. 11 is an axial cross-sectional view of a "unit bearing" motor also assembled with the use of the instant invention.

Referring now to the drawings in more detail, FIGS. 1 and 6 illustrate the invention as applied to a small motor of the squirrel-cage induction type. The motor, identified generally by numeral 20 in FIG. 1, comprises a stator core member 21 and rotor member 22 which are secured together for relative rotation by supporting means generally indicated at 23. The stator member 21 comprises a magnetic core formed of a plurality of stacked thin laminations 24 of magnetic material fixedly secured together with the usual field coils 25 wound thereon. The stator core 21 is provided with an accurately dimensioned inner surface or bore 26 which is finished to a cylindrical form of predetermined diameter. The rotor 22, which is concentrically secured to a shaft 27 in any suitable fashion (not shown), is arranged coaxially and concentrically within stator bore 26 so as to define an annular air gap 28 therebetween. The rotor has the standard squirrel-cage type winding which includes a plurality of equispaced conductors 29 extending the axial length of the rotor, and a pair of end rings 30 and 31 at the respective ends of the rotor, which join all the conductors 29 together electrically.

The supporting means 23 in its preferred form comprises two identical end shield assemblies 32 and 33. As is better shown in FIG. 2, each end shield assembly includes a substantially U-shaped stamped metal member 34 having a pair of diametrically disposed leg portions 35 joined by a bight or connecting section 36. The leg portions 35 are so bent that the space between their outer ends is slightly greater than the width of the stator core member 21. Centrally of each section 36 and extending axially therethrough, is a bearing 37, adapted to receive the rotor shaft 27. Bearing 37, which may be of the sintered variety, is fixedly secured to section 36 by any suitable means, such as, for example, by a groove and flange arrangement indicated at 38. A bearing and shaft lubricating means in the form of a cylindrical oil-impregnated felt body 39 may be provided in juxtaposed relation with the bearing 37. In addition, each end shield assembly contains mounting means in the form of a hub and resilient annulus generally shown at 40, which may be used for mounting the motor 20 onto a stationary motor supporting base member (not shown). A pair of apertures 41 are provided in section 36 for purposes which will become apparent as the description proceeds.

Now, in accordance with the improved method of the present invention, the motor 20 is assembled by initially placing one end shield assembly 32 onto an assembly fixture 42 with the leg portions 35 of the end shield extending upwardly, as shown in FIGS. 2 and 7. For purposes of illustration only, assembly fixture 42 is shown in FIG. 6 as comprising a cast base plate 43 having a pair of upwardly extending side walls 44 and an integrally formed, centrally positioned, raised block portion 45. The block portion 45 is provided with a longitudinally extending bore 46 in which is pivotally mounted, by suitable means such as pin 47, a bar 48. At each end of the bar, there is pivotally attached an arm 49 which is adapted to fit through apertures 41 of each end shield member 34. An upper plate 50 is fixedly attached, such as by welding (not shown) to the upper ends of the side walls 44. Plate 50 is formed with a pair of spaced apart apertures 51 through which arms 47 movably extend. Integrally formed and centrally disposed on the upper surface of plate 50 is an annular stud portion 52, adapted to butt against outer end surface 53 of bearing 37 and support the end shield assembly 32. A shaft-receiving recess 54 is provided in the stud portion 52 and plate 50 with a screw means 55 communicating with and in adjustable relationship to the lower portion 56 of recess 54. The significance of the afore-described fixture construction will become more apparent as the description proceeds.

As shown in FIG. 3, after the end shield assembly 32 is positioned on the assembly fixture 42 with arms 49 extending upwardly through end shield apertures 41 and with stud portion 52 supporting the end shield assembly, the rotor and shaft assembly 57, which has a thrust washer 58 and 59 respectively mounted at each end of the rotor 22, is arranged in the fixture assembly in a vertical manner, so that the lower washer 58 lies between end ring 30 and the inner end face 60 of bearing 37. A portion of shaft 27 extends through bearing 37 and into recess 54 of the fixture. Thus, it can be seen that screw means 55 can be adjusted to contact shaft end 61, raising the rotor and shaft assembly a predetermined distance away from the inner end face 60 of bearing 37, which rests on stud 52, thereby setting a selected amount of shaft end play into the motor as will be more completely explained hereinafter.

In order for rotor 22 to be properly assembled within stator 21, suitable means are provided for maintaining the air gap as desired. In the preferred method, as illustrated in FIG. 4, the means comprises shim means 62, composed of a fusible or meltable material (the composition to be further discussed below). When this type of shim means is used, it may be provided as disclosed and claimed in the co-pending application of Lawrence W. Wightman, Serial No. 757,652, filed August 26, 1958 and assigned to the same assignee of the present invention. However, it will be obvious to those skilled in the art that the method of this invention encompasses the use of any removable shim means, which serve to control the positioning of the rotor within the stator member. For example, metal gage strips of predetermined thickness could be used; however, means, such as suitably placed apertures, must be included in the motor shell for removal of the metal shim means after the assembly of the parts has been completed. These apertures may be closed by any suitable means after the metal shim means have been removed, if it is desired to use metal shim means in assembling totally enclosed motors. Moreover, it should be apparent that the precise method and time of fixing the shim means in the assembly is dependent upon the type; i.e., meltable or solid metal, and the form used. Therefore, for purposes of illustration only, the meltable shim means shown are applied to the bore or inner surface 26 of the stator core 21 prior to assembly of the stator 21 with the rotor 22.

The stator 21 with shim means 62 is lowered over the motor assembly 22 until end face 63 of the stator laminations rests on the ends of fixture arms 49. The shim means 62 accurately and concentrically positions and maintains the stator and rotor members relative to each other. The length of the arms 49 is such that the lower end face 63 of the stator core 21 fits below the upper part of the end shield leg portion 35 adjacent and preferably spaced from the outer surface 64 of stator core member 21. In other words, the length of arms 49 determines the amount of overlap or interfit between the respective parts. Since the arms 49 are pivotally mounted and support the stator at spaced apart points along an axis perpendicular to the transverse axis of the stator core 21, dimensional variations between each stator core are absorbed by the assembly fixture. It will also be observed that the assembly fixture permits the stator 21 and rotor 22 which are being maintained in a positive relationship with regard to each other by shim means 62, to "float" freely relative to the end shield assembly 32. After the stator is in place on the arms 49, structural bonding means 65, more fully described hereinafter, in the form of an adhesive material in a plastic state, is applied, by any suitable means such as by squirting (not shown) to the space 66 between the stator outer surface 64 and the adjacent parts 67 of the end shield leg portion 35 in a sufficient amount to substantially fill the space.

Thereafter, the other end shield assembly 33 is mounted over the upper end of the rotor and stator-assembly with the inner end surface of the upper bearing 34 resting against thrust washer 59, which is carried by end ring 31. Structural bonding means 65 is applied, like before, to the space between the outer surface 64 of the stator and the adjacent parts 68 of the end shield leg portions 35. Of course, it will be obvious to those skilled in the art that the structural adhesive material could equally as well be applied to a portion of the outer periphery of the stator core 21 or to a portion of the inner surface of the end shield leg portions 35 or to both portions, before assembly of the parts as well as after, without departing from the true scope and spirit of the invention.

At this point in the assembly procedure, it should be observed that the motor parts are in a final assembled form. The shim means 62 maintain the rotor and stator members in a definite and concentric relation, while the plastic bonding means 65 allows the two end shield assemblies 32 and 33, which in this embodiment form the rotor supporting means, to be movable with respect to the stator and rotor members. Thus, it is this latter relationship, instead of the concentricity of the stator to the rotor, which will vary to give alignment of the upper and lower bearings. Since the bearings are fitted onto the rotor shaft, positive and accurate alignment of them is absolutely assured. Further, since the upper end shield assembly was placed in a relatively final position in a manner as previously explained; i.e., the end surface of the upper bearing 37 is effectively mounted in juxtaposed relation to rotor end ring 31 with thrust member 59 tightly disposed therebetween, all the end play between the rotor 22 and the bearings 37 is wholly determined by the adjustment of screw means 55, as heretofore described. There is no need to provide shims or other spacer means for properly limiting the axial movement or end play of the rotor and shaft assembly during rotation.

With the parts in the final assembled relation, the bonding means 65 is then caused to be cured by any suitable means, such as by the application of a controlled amount of heat provided by kiln 69 with its controlled heating means 70, as shown in FIG. 5. Of course, any curing means may be employed; for example, with an adequate amount of hardener in the bonding means, the curing might be done at room temperature in a predetermined length of time. Therefore, the kiln is shown by way of illustration only. To effect the curing, the assembly fixture with the assembled, but yet unbonded motor still arranged thereon, is placed in an upright position onto a belt-type conveyor 71 which is driven by motor and pulley means 72. The conveyer transports the motor and fixture assembly through the kiln at a regulated rate.

Since in the preferred method the shim means, holding the rotor and stator members concentric relative to each other, are of the meltable variety, it is essential that any application of heat must be applied in such a manner that setting or hardening of the bonding means is effected before the shim material melts, but it is not necessary that the bonding means be entirely cured, so long as the bonding means is hardened to a point wherein it will retain the rotor supporting means in a fixed relationship to the stator. Once the bonding means has been cured, the end shield assemblies 32 and 33 are rigidly secured to the outer surface of the stator core 21. Since the bearings 37 were freely mounted over rotor shaft 27 so as to be in the proper aligned position and further, since the bonding means, when cured, does not shrink or place any stress whatsoever between the rotor supporting means and the stator member, the alignment of the bearings and rotor is not affected in any way by the securement of the end shield assemblies to the stator. By the same token, the shim means, which is still in place in the air gap formed between the rotor and stator members, maintains the members in an accurate concentric relation, and upon the curing of the bonding means, the members are then permanently held in such position through the end shields and the bearings.

The final step to be performed is the removal of the shim means by any suitable means, thereby freeing the rotor for rotation relative to the stator. This, of course, can be accomplished by any number of ways. In the preferred embodiment, the meltable shim means are removed simply by the additional heat applied to the assembly as it continues to pass through the kiln 69 after the bonding material has been cured. Of course, the application of heat, whether direct or indirect, must be such that the temperature sensitive parts of the motor; e.g., insulating parts, are unaffected. FIG. 6 depicts the fixture assembly and motor after removal from the conveyer subsequent to the final shim melting step. The shim means, as shown, has been melted and deposited onto the inner surface of the bottom end shield assembly 32, adhering thereto upon the discontinuance of the heating application. As heretofore pointed out, although the meltable shim means described provides the optimum in ease of assembly, mechanical shim means may be used in which case it is merely necessary to remove them through suitable openings provided in the end shields (not shown) after the curing step.

Now, referring more specifically to the bonding means 65, preferably, the non-shrinking structural adhesive material should have the desirable attributes of good cohesion as well as adhesion; that is, the material should be structurally strong in itself and must have the ability to adhere to different kinds of materials. Further, it should have the characteristic of flowing onto a surface, wetting the surface and staying where it is initially placed until it becomes permanently hardened. Moreover, once the structural bonding material has been hardened or cured, it should be stable, i.e., thermo-setting in nature, and must not change from the solid form upon a certain amount of reheating, such as may be experienced during operation of the machine under various conditions.

The following examples are given in order to illustrate more clearly how the invention, as described above, has been carried forth in actual practice.

EXAMPLE 1

Induction motor parts having the following dimensions were used:

Rotor outer diameter $\frac{1.755'' \text{ max.}}{1.753'' \text{ min.}}$

Stator bore diameter $\frac{1.778'' \text{ max.}}{1.774'' \text{ min.}}$

Stator outer diameter $\frac{3.211'' \text{ max.}}{3.204'' \text{ min.}}$

End shields inner diameter of flange $\frac{3.245'' \text{ max.}}{3.235'' \text{ min.}}$ In order to effect suitable shimming of the rotor and stator during assembly, the inner surface or bore of the stator was coated with Warcosine wax, a mixture including bee's wax and paraffin, by an extruding and wiping process. While supported on an assembly fixture of the type heretofore disclosed, the end shields and bearings were assembled with the remainder of the parts, and structural adhesive bonding material was injected into the space between the outer section or flange of the end shields and the adjacent stator surface. The bonding material used was composed of an epoxy resin known as EA-200 (Copolymers Inc.) having a polyamide hardener or curing agent. The assembled motor and the supporting fixture were then placed in an oven, which had been preheated over 155° centigrade. After being subjected to the heat of the oven for approximately seven minutes, the temperature of the adhesive bonding material was raised from room temperature to approximately 105° centigrade. At this point, the adhesive bonding material had set sufficiently to retain the end shields in a fixed relationship with the stator.

The application of heat was continued for an additional two to three minutes until the wax in the air gap reached its melting temperature of approximately 69° centigrade. Although the wax melts at a temperature somewhat below that at which the adhesive bonding material tends to harden and "set up," the temperature of the adhesive is raised more rapidly than the temperature of the wax due to the different locations in the motor and different thermal characteristics of the respective materials. When the wax melted out of contact with the stator and rotor members, the members were freely rotatable relative to each other.

Heating of the motor was continued until the adhesive material reached a maximum temperature of 148° centigrade. After the motor had been subjected to heat in the oven for a total time of sixteen minutes, thereby substantially curing the adhesive material, the motor and supporting fixture were removed from the oven and allowed to cool. It was found that this construction provided for an exceedingly economical assembly, while at the same time, the air gap between the stator and the rotor was easily maintained within such close tolerances that an air gap of .006" and .010" is completely practical. Moreover, it was found that the resin, which experienced exceedingly little shrinkage upon curing, effectively eliminated all stresses, both for the end shield and for the stator, and the bearings and rotor shaft were accurately aligned.

EXAMPLE 2

A motor similar in construction to that of Example 1 was permanently assembled as outlined above, with the exception that epoxy resin having an amine hardener or curing agent was used as the structural adhesive bonding material. Upon examination of the resultant motor it was found that the motor had the same excellent air gap control and bearing and shaft alignment of the motor of Example 1.

EXAMPLE 3

A motor having a .005" and .008" air gap was provided with shim means composed of .004" thick steel strips. The same assembly method as for Example 1 was followed, except that instead of the adhesive material of Example 1, the following material was provided: epoxy resin with an amine hardening or curing agent, bondmaster M-643, rubber and asbestos. The resin was then cured by heating the material to 65° C. for ½ hour. At this point, the shims were removed to leave the rotor and stator freely rotatable relative to each other. As before, the motor was provided with excellent bearing and shaft alignment as well as a finely controlled air gap.

The foregoing examples illustrate the fact that in practice, the assembly operation is exceedingly easy to employ and produces a machine having a finely precise air gap and superior bearing and shaft alignment without difficulty.

As shown by the above examples, epoxy resin having a polyamide hardener and epoxy resin with an amine curing agent are two usable adhesive materials having adhesive qualities and very little shrinkage upon curing. In addition, other adhesive bonding materials will readily occur to mind such as phenol formaldehyde condensate and a polyvinylacetol (EC-1300), rubber type cement, and cellulose esters dissolved in suitable solvents. It is further to be understood that the invention is intended to cover any suitable adhesive material including a curable organic resin of the type having very little shrinkage.

The resins are generally not provided in their pure form, but are preferably mixed with fillers, both for reasons of economy and in order to provide a paste-like consistency which is more readily controllable for application purposes than a pure liquid or a powder, the form of most pure resins. Among the many fillers which may be used, includes: Cab-O-Sil, mica, titanium oxide, Wollastanite, glass fibers, silica, alumina, asbestos, barium sulfate, and calcium carbonate.

With respect to the meltable shim means, the example above is not inclusive as to the materials which can be used. For example, shellac-wax combinations, polyamides such as nylon, alkyds, and movalaks may be used. Other materials will readily come to the mind of those skilled in the art.

Also, it may well be that, rather than melting in the narrow sense (that is, going from a solid to a liquid state) some suitable material will be discovered which goes from the solid to the gaseous state directly, i.e., which sublines like naphthalene. Therefore, in order to cover any obvious applicable type of material, the term "meltable" is intended to be taken in its broader sense.

It should be apparent to those skilled in the art that the present invention is not limited to the preferred assembly procedure set forth above, but our improved method may be varied without a departure from the true scope and spirit of the invention. For instance, if desired, one end shield assembly could be fixedly secured to the stator assembly; i.e., the adhesive bonding material between the two assemblies hardened by suitable means, before the addition of the second end shield assembly to the unit thereafter, the second end shield assembly could be rigidly attached to the stator assembly in the same manner previously described, thus completing the securement of the rotor supporting means to the stator assembly. The assembled motor would have the same accurate bearing and shaft alignment and controlled air gap, as the motor assembled by the preferred method. In addition, it will occur to those skilled in the art that our improved construction and method of assembly are inherently versatile and adaptable for use with a variety of motor types. For example, the motor illustrated in FIG. 1 could be made totally enclosed and still embody the present invention merely by forming the outer surface 64 of stator core 21 with a round configuration. The end shield assemblies 32 and 33, which comprise the rotor supporting means would take a cup-shaped form, and structural bonding material 65, as in FIG. 1, may be provided between the outer surface of the stator core and the adjacent portion of the end shield, thus enclosing the ends of the stator core and securing the end shield assemblies to the stator.

FIG. 8 illustrates another type of machine, an induction motor having its end shield assemblies rigidly attached to opposite stator faces, which may be assembled by our improved method as described above with a minor adjustment of the fixture. The assembled motor comprises a rotor 75 which is secured to a shaft 76 and is concentrically arranged within a stator 77, defining an air gap 78 therewith. The rotor member is similar in structure to the rotor of the embodiment of FIG. 1; the stator is constructed of a plurality of laminations 79 of magnetic material, but its outer surface 80 is round, rather than generally rectangular like the stator illustrated in FIG. 1. Outwardly of the stator winding 81, the stator is provided with a plurality of apertures or holes 82 radially spaced at a predetermined distance from the longitudinal axis of the stator member. In the illustrated embodiment, these holes extend longitudinally through the stator, since this allows the use of a single type of punching, but it will be understood that recesses formed in the opposite stator faces could be used equally as well.

Supported by the stator 77 and, in turn, supporting the rotor 75, are a pair of bell or cup-shaped end shield assemblies 83 and 84. These end shield assemblies each contain a plurality of projections 85 which are adapted to be loosely received in holes 82. Bonding means 65 of the type described above is contained in holes 82, and rigidly secures the end shield assemblies to the stator. For supporting the rotor, each end shield assembly has fixedly secured thereto sintered bearings 86, adapted to carry the rotor and shaft assembly. As is in common practice today, each end shield asesmbly is further provided with a cylindrical oil impregnated felt body 87 for bearing and shaft lubricating purposes. Aperture 88 provides communication between the sintered bearing and the oil reserve. Thrust bearing means 89 and 90 are provided between each rotor end face 91 and 92 and the inner end of the bearings. It will be seen that by the use of our improved method the rotor may be positioned concentrically within the stator and the bearings 86 are positively aligned on the shaft before the bonding material 65 is allowed to harden, thereby securing the end shields to the stator. Thus, here again, the desired positioning of the rotor supporting means is attained without any stressing of the parts and with the same ease of assembly as for the first embodiment.

Referring now to FIG. 9, we have shown another motor embodiment assembled by our improved method of assembly outlined above. Illustrated is an induction motor 93 of the totally enclosed stator encapsulated type which is extremely moisture resistant. In the motor 93, stator 94 comprises a laminated magnetic core 95 having an accurately dimensioned radially inner surface 96 defining a rotor receiving annular bore. Coils 97, forming an exciting winding, are positioned on the core. A rotor member 98, which is secured to shaft 99, is concentrically positioned within the bore, forming air gap 100 between the rotor 98 and stator surface 96. The stator 94 and coils 97 are enveloped in a solid impregnating compound 101, such as thermo-setting impregnating varnish, whereby there is formed a stationary assembly 102. As shown, the rotor supporting means also forms a closure means and comprises two substantially cup-shaped end closures 103 and 104, each having a shaft-receiving sintered bearing 105 rigidly mounted axially therethrough. As described for the modification illustrated by FIG. 8, bearing lubrication means 106 are provided in each end shield; a thrust member 107 is secured to the shaft 99 at each end of the rotor between the rotor end ring 108 and the adjacent bearing 105. The outer longitudinally extending periphery or annular side wall 109 of each end closure is adjacent to and preferably spaced from a portion 110 to the encapsulating material covering the coils. Structural adhesive bonding material 65 of the type described previously, fills the void between each closure member and the adjacent encapsulating material, thereby rigidly securing the rotor supporting means to the stationary assembly 102 and completing the enclosure of the rotor within the stationary assembly.

Therefore, like the machine embodiments shown in FIGS. 1 and 8, the improved totally encapsulated stator type motor illustrated by FIG. 9 has a rotor supporting means, including shaft bearings, attached to the stationary assembly solely by means of the non-shrinking hardenable structural adhesive bonding material. Thus, the totally encapsulating stator type motor is provided with an accurate alignment of the bearings and shaft as well as a closely controlled air gap between the rotor and stator members.

FIG. 10 shows an assembled motor 111 of a type having detachable end shields, assembled in accordance with our improved manufacturing procedure. The stator and rotor members are laminated and similar in construction to those heretofore discussed, the rotor 112 being provided with a cast squirrel-cage winding 113 and the stator 114 being provided with coils 115 forming an exciting winding. A housing 116, formed of two substantially cylindrical cast iron members 117 and 118 respectively, surrounds the stator 114. The housing members 117 and 118 are secured together in any suitable fashion, such as by a rabbet joint 119, and the stator 114 is rigidly bonded to the housing members, as indicated at 120. The ends 121 and 122 of the housing are closed by detachable end shields or plates 123 and 124, which are secured thereto by screw means 125. These end shields, together with the housing members and the stator, form the complete stationary assembly 126.

Each end shield includes a centrally disposed aperture or opening 127 in which is mounted a rotor supporting means generally indicated at 128. The means 128 includes a flanged, cup-shaped element 129 which extends axially through, but is preferably radially spaced from the wall 130 of opening 127. Bearing 131 is fixedly mounted with the element 129 and carries one end of rotor shaft 132. Thrust bearing means 133 is fixedly positioned on the shaft between each bearing element 129 and the adjacent end face 134 of the rotor. Structural adhesive bonding material 65 of the type hereinbefore described fills the space between element 129 and the wall 130 of opening 127. This structural bonding material so holds the cup-shaped elements 129, that the bearings 131 are axially aligned, and the rotor and stator members are concentrically supported with a controlled air gap 135 therebetween.

Referring now to FIG. 11, a "unit bearing" type motor 136 is illustrated as being assembled according to the improved method previously discussed. Motor 136 is provided with a stator assembly 137 and a rotor assembly 138, concentrically arranged with an accurate air gap 139 therebetween. The stator 137 includes a laminated magnetic core member 140 with exciting windings 141; the rotor assembly 138 includes a generally cup-shaped rotor 142 and a shaft 143. As illustrated, the rotor has a laminated core 144 of magnetic material formed with winding slots 145 in which conductors 146 of a cast or fabricated squirrel-cage winding are arranged. A short circuiting end ring 147 is formed on one side of the laminated core 144. Another short circuiting end ring 148 is electrically connected to the other end of conductors 146 and extends over the side of the laminated core 144, thereby providing an arrangement for retaining the laminations of the core 144 in an assembled relation between the end rings 147 and 148 and the winding conductors 146. The rotor is adapted to be mounted on the supporting shaft 143 by the provision of a hub portion 149 cast integral with the end ring 148 and secured to a sleeve 150 which is arranged in driving engagement with a splined or knurled end portion 151 of the shaft 143.

The stator assembly mounts a casting or frame 152, which serves as the rotor supporting means. As shown, the frame 152, formed of cast iron or die cast aluminum, extends as an end shield 153 at one end of the machine. The frame is provided with an outwardly extending web portion 154 formed integral with the end shield portion 153 and which has a central located hub 155 having a central bore 156. Shaft 143 is adapted to be mounted for rotation in the centrally located hub 155. Shaft 143 is formed with a relieved section 157 of smaller diameter than the adjacent portions 158 and 159. The shaft portions 158 and 159 are rotatably supported by the cylindrical stationary bearing surfaces 160 and 161 of the central bore 156, whereby the shaft is journaled at spaced apart points. It will be noted that with this construction the rotor assembly is rotatably supported only by these bearings, both of which are on the same side of it, and there is no other support on the other side of the rotor. This arrangement is commonly referred to as a "unit bearing" motor.

A thrust washer 162, designed for carrying the weight of the rotor in one direction, is arranged on shaft 143 at the inner end of bearing 161, while a second thrust washer 163 for limiting movement of the rotor in the other direction is fixedly positioned on the shaft portion 164. A felt washer 163 is arranged between the thrust washer 162 and the end of the sleeve 150 to cushion end bump and minimize resultant noise.

In order to provide suitable lubrication to the bearing surfaces of the shaft 143, a lubricant reservoir 165 consisting of lubrication absorbing material, such as wool, may be provided in end shield cover 166. A lubricating feeding wick 167, also of lubricant absorbing material, is arranged into contact with shaft portion 168. Lubricant, such as any suitable oil, is placed in the reservoir and is substantially absorbed by the loose wool and the wick 167 such that it is fed at a desired rate to the shaft portion 168, from which it is fed along the bearing by a spiral groove 169 formed in the shaft portion 166 and passes into the pocket formed around the relieved portion 157 of the shaft and is then fed to the bearing engaging portion 161. The oil is then thrown outwardly by oil slinger portion 170 formed on the inner end of sleeve 150 and is caught by an absorbent wick 171. An enclosing housing 172 is held concentric with the shaft bore by any suitable means, such as is generally indicated at 173 and is arranged to extend around the oil slinger 170 and wick 171 to provide an oil collection chamber. This housing 172 is arranged in communication with an oil return wick 174 which returns the lubricant from the collecting chamber to the oil reservoir 165. This type of lubricating system is described and claimed in the H. C. Bradley Patent No. 2,522,985 assigned to the same assignee of the present invention.

Frame 152 with its integrally formed bearing means is rigidly fastened to stator 138 by the same type structural adhesive bonding material 65 heretofore disclosed. The frame 152 has an outer section with an integrally formed flanged portion 175 immediately adjacent to and preferably spaced from the outer surface 176 of stator core 120. The structural adhesive bonding material 65 is provided between flange portion 175 and outer core surface 176. A second end shield cover 177 may be included to complete the enclosure of the stator and rotor assemblies. With this construction, as is the case in all the machine embodiments heretofore described, an improved dynamoelectric machine has been provided in which the rotor suporting means, including the shaft bearings, is rigidly secured to the stationary assembly solely by means of the structural non-shrinking adhesive bonding material. Thus, the machine structure provides for accurate bearing alignment and excellent control of the air gap between the rotor and stator members.

It will be recognized from the foregoing disclosure that an important aspect of the improved method of assembly in the present invention is the maintenance of the rotor supporting means loosely adjustable relative to the stationary assembly with a hardenable non-shrinking structural bonding material therebetween, until the asesmbly of parts is complete, while at the same time, the rotor and stator members are being positively held in a predetermined spaced relation with respect to each other until the bonding material has been sufficiently hardened to secure the rotor supporting means to the stationary assembly.

In practicing our present invention, it will occur to those skilled in the art that improved dynamoelectric machines may take other forms than those illustrated, when assembled by our improved method, without departing from the true spirit and scope of the invention. For example, "axial air gap" or pan cake machines; i.e., machines which have the same electrical characteristics as the preferred machine embodiments illustrated herein, but mechanically differ in that the rotor turns in a plane parallel to rather than radially within the stator member, may be constructed with the rotor supporting means rigidly secured to the stationary assembly solely by means of the previously mentioned structural non-shrinking adhesive bonding material. The machine would have the same excellent air gap control and bearing alignment as described heretofore.

Of course, the present invention is equally adaptable to machines which have a controlled eccentricity of the air gap between the rotor and stator members. This kind of machine could be assembled in accordance with the improved assembly procedure outlined above; however, the form of the shim means used would include shim means of different and controlled sizes positioned in the air gap between the rotor and stator members at predetermined locations, thereby building into the machine a controlled amount of air gap eccentricity.

It will be readily manifest from the foregoing that the advantages of this invention are numerous. The machine construction provides for an accurate alignment of the bearings and shaft, and for a close control of the air gap between the rotor and stator members. Moreover, the improved method of assembly of the invention permits a mass production manufacture of a uniformly high quality machine having excellent operating characteristics, with a minimum amount of variance between machines and at a unit cost considerably lower than has been accomplished heretofore. More specifically, the number and cost of the individual manufacturing operations have been reduced while the accuracy thereof has been improved. Further, machines are produced devoid of stresses which would tend to deform the alignment of either the bearings and the shaft or the rotor and stator. In addition, inexpensive parts may be used without affecting the accurate alignment of the various components. Moreover, the desired amount of rotor and shaft end play is easily set into the machine. Finally, due to the simplicity of the improved assembly method, it is suitable for use with a variety of machine types.

While the present invention has been described by reference to particular embodiments thereof, it is to be understood that numerous modifications may be made by those skilled in the art without actually departing from the invention. We therefore aim in the appended claims to cover all such equivalent variations as come within the true spirit and scope of the invention.

What we claim as new and desire to secure by Letters Patent of the United States is:

1. A method of assembling a dynamoelectric machine having a stator assembly, a rotor assembly including a shaft, and rotor supporting means including a pair of bearing supports each mounting a bearing for rotatably supporting said rotor assembly from said stator assembly, comprising the steps of assembling said rotor and said stator assemblies in a predetermined concentric relationship with removable positioning means arranged in the air gap therebetween to maintain the assemblies in said concentric relationship; positioning each bearing support respectively adjacent a surface of said stator in loosely adjustable, generally spaced and non-engaging relation thereto, with a surface of the respective bearing supports and the associated surface of said stator assembly being in overlapping relation, with said shaft extending into and aligning said bearings therewith and with an adhesive bonding material including a substantially non-shrinking organic thermosetting resin in a plastic state disposed in the space between the respective overlapping bearing support surfaces and the associated surfaces of said stator assembly; curing said adhesive bonding material as the shaft sustains the previously established relation with the bearings without interference from said overlapping surfaces and hardening adhesive material thereby rigidly securing together said stator assembly and said bearing supports; and removing said removable positioning means from the air gap to release said stator and said rotor assemblies for relative rotation, said cured material and bearing supports retaining the established relationships substantially free of stresses for the operating life of the machine.

2. A method of assembling a dynamoelectric machine including a stator, a rotatable assembly having a shaft and rotor attached to the shaft, and rotatable assembly, supporting means for supporting the rotor and stator for relative rotation comprising at least one bearing and a support mounting the bearing, the support having a generally axially extending wall disposed outwardly from the bearing, the steps comprising: assembling said rotatable assembly and said stator in a predetermined relationship with removable positioning means engaging both said stator and rotatable assembly for maintaining them temporarily in said relationship; positioning an internal surface of said axially extending wall of said rotatable assembly supporting means in loosely adjustable and non-supporting, generally spaced, relation adjacent to the outer peripheral surface of said stator, with the wall telescoping a part of the outer peripheral surface of the stator, with the shaft extending into the bearing of said rotatable assembly support means, and with a curable, substantially non-shrinking thermosetting bonding material in an unhardened state disposed in the space between the telescoping surfaces of said stator and adjacent internal wall surface of said rotatable assembly supporting means to permit generally unstressed relative movement therebetween as the shaft aligns the bearing therewith; curing said bonding material sufficiently to hold said stator and telescoping surface of said supporting means firmly together while the previously established relationships are being maintained; and removing said removable positioning means from engagement with said stator and rotatable assembly to release them for relative rotation, said cured thermo-setting bonding material and rotatable assembly supporting means fixedly retaining said previously established relationships in the assembled machine.

3. A method of assembling a dynamoelectric machine having a stator comprising a core carrying windings with first and second end turns projecting axially beyond the respective end faces of the core encapsulated in cured thermo-setting material, a rotor, a shaft secured to said rotor, and rotor supporting means including a pair of bearing supports with bearings for rotatably supporting said rotor from said stator, comprising the steps of positioning said rotor and said stator with shim means in the air gap therebetween in engagement with said rotor and said stator to maintain them in concentric relationship, placing one of said bearing supports adjacent said stator, with the shaft extending into the bearing of said one bearing support to align the bearing therewith, with said one support and the first encapsulated end turn having surfaces in loosely adjustable, unsupporting and overlapping relations, and with an adhesive substantially non-shrinking thermosetting bonding material in a plastic state between the overlapping one bearing support and the first encapsulated end turn; positioning the second bearing support adjacent the stator, with the shaft extending into the bearing of said second bearing support to align that bearing therewith, with the second bearing support and second encapsulated end turn having surfaces in loosely adjustable unsupporting and overlapping relationship and with an adhesive substantially non-shrinking thermosetting bonding material in a plastic state between the overlapping surfaces of said second bearing support and second encapsulated end turn; hardening said adhesive bonding material, as the shaft retains the previously established relationship with the bearings and the shim means maintains the concentricity between the rotor and the stator, thereby securing together said stator to said bearing supports for the operating life of the machine; and removing said shim means from engagement with said stator and rotor to release them for relative rotation.

4. A method of assembling a dynamoelectric machine having a stator, rotor, a shaft carrying said rotor and a supporting means including at least one bearing, comprising the steps of: arranging the stator and the rotor supporting means adjacent one another in loosely adjustable, generally non-engaging, spaced and overlapping relation with the rotor shaft extending into the bearing, with a predetermined air gap established between said rotor and stator by removable spacing means engaging said stator and rotor in the air gap, and with adhesive substantially non-shrinking thermo-setting material in an unhardened state disposed in the space between the adjacent and overlapping surfaces of said supporting means and of said stator in engagement therewith, said unhardened material allowing unstressed relative movement of the rotor supporting means with respect to the rotor shaft and stator as the shaft aligns the bearing therewith; hardening said thermosetting material without introducing objectionable stresses between said stator and rotor supporting means while maintaining the established predetermined air gap and thereafter removing said removable spacing means from the air gap whereby upon hardening of said material the parts are secured together with said hardened material and rotor supporting means permanently retaining both the predetermined air gap and the alignment between the bearing and shaft established prior to the hardening of the material and removal of said removable spacing means from the air gap, for the operating life of the machine.

5. A method of assembling a dynamoelectric machine having a stator, a rotatable assembly including a shaft and a rotor secured to the shaft, and rotor supporting means including a pair of bearing supports each carrying a bearing for rotatably supporting one end of the rotor shaft, comprising the steps: arranging the stator and rotor in coaxial relation to define a predetermined air gap therebetween with removable spacing means engaging both stator and rotatable assembly to maintain said air gap, with the rotor shaft extending into each bearing, with the stator periphery disposed adjacent and in loosely adjustable, spaced and generally non-engaging relation to each bearing support and with a surface of each bearing support and the adjacent surface of the stator periphery overlapping one another; adjusting the axial position of the rotor and shaft relative to at least one bearing support and introducing an unhardened adhesive substantially non-shrinking thermo-setting material in the space between and in engagement with the overlapping surfaces of the stator periphery and of the respective adjacent bearing supports; and hardening the adhesive material while maintaining the predetermined air gap between the rotor and stator, whereby the bearing supports and stator are secured together in a permanently fixed relation for the operative life of the machine and a preselected axial movement of the rotor and shaft in the machine is provided.

6. A method of assembling a dynamoelectric machine including a stationary assembly having a stator, a rotatable assembly having a shaft and a rotor secured to said shaft, and rotor supporting means having at least one bearing support mounting a bearing for rotatably supporting said stationary and rotatable assemblies relative to each other, the method comprising the steps: arranging a surface of the stationary assembly and a surface of the bearing support in adjacent, loosely adjustable, non-supporting and overlapping relation, with the shaft extending into the bearing to align the bearing coaxially with the shaft, with the stationary assembly and rotatable assembly temporarily held in a fixed relation by spacing means engaging both assemblies to establish a predetermined air gap therebetween, and with a substantially non-shrinking adhesive material in an unhardened state disposed between and engaging the adjacent and overlapping surfaces of said stationary assembly and of the associated bearing support respectively thereby permitting generally unstressed relative movement between the adjacent surface as the shaft coaxially aligns the bearing to provide a fixed relation therewith; hardening said adhesive material while maintaining the previously established, fixed relations; and discontinuing engagement of said spacing means from said assemblies thereby causing the shaft and rotor to be released for relative rotation with respect to the bearing, bearing support, and stationary assembly while the rotor supporting means retain said previously established coaxial relation between the bearing and shaft and the predetermined air gap established between the stator and rotor.

7. A method of assembling a dynamoelectric machine including a stationary assembly having a stator, a shaft, a rotatable member secured to said shaft, and a pair of bearing support assemblies each having a bearing for rotatably carrying the shaft, the method comprising the steps: establishing and holding said stationary assembly and rotatable member in a temporarily fixed relation with an air gap defined therebetween by spacer means disposed in said air gap; applying heat hardenable substantially non-shrinking adhesive material in an unhardened state to preselected surfaces of at least one of said assemblies and arranging said assemblies adjacent one another, with said shaft extending into each bearing of said bearing support assemblies, and with the preselected surfaces disposed in a loosely adjustable, generally non-supporting and overlapping relation so that said unhardened adhesive material contacts adjacent and overlapping surfaces of said stationary assembly and the respective bearing support assemblies thereby permitting generally unstressed relative movement between said adjacent and overlapping surfaces as the shaft aligns the bearings therewith; hardening said adhesive material while maintaining the previously established relations after the bearings and shaft have been aligned; and releasing the shaft and rotatable member for relative rotation with respect to the respective bearing support assemblies and stationary assembly by removing said spacer means from the air gap, said bearing support assemblies thereby retaining the bearing and shaft alignment and the predetermined air gap previously established between the stator and rotatable member.

8. A method of assembling a dynamoelectric machine including a stationary assembly having a stator, a rotatable assembly having a shaft and a rotor secured to said shaft, and rotor supporting means having at least one bearing support mounting a bearing for rotatably supporting said stationary and rotatable assemblies relative to each other with an air gap therebetween, the method comprising the steps: arranging the stationary assembly and a surface of the bearing support in loosely adjustable, non-supporting, adjacent overlapping relation, with the shaft extending into and carrying the bearing, with the stationary assembly and rotatable assembly temporarily held in a fixed, spaced relation by solid fusible material positioned in the air gap between and engaging said assemblies, and with a substantially non-shrinking heat-hardenable adhesive material in an unhardened state disposed between and adhering to a surface of said stationary assembly and the adjacent bearing support surface thereby permitting relative movement between the adjacent overlapping surface as the shaft aligns the bearing; applying heat to said adhesive material and hardening it while maintaining the previously established relations, and applying heat to said fusible material to cause its removal from the air gap thereby releasing said shaft and rotor for relative rotation with respect to the bearing, bearing support, and stationary assembly whereby the rotor supporting means retain said previously established relation between the bearing and shaft and the predetermined air gap established between the stator and rotor.

9. A method of assembling a dynamoelectric machine including a stationary assembly having a stator, a shaft, a rotatable member secured to said shaft in spaced relation with the stator to define an air gap therebetween, and a pair of bearing support assemblies each having a wall mounting a bearing for rotatably carrying the shaft, the method comprising the steps: arranging said stationary assembly and rotatable member in a temporarily fixed relation with fusible material in the air gap; applying curable substantially non-shrinking thermo-setting material in an unhardened state to preselected surfaces of at least one of said assemblies; arranging said assemblies adjacent one another, with said shaft extending into and carrying each bearing of the respective bearing support assemblies, and with the preselected surfaces disposed in a loosely adjustable, generally nonsupporting and adjacent overlapping relation so that said unhardened thermo-setting material contacts adjacent overlapping surfaces and permits relative movement between said adjacent overlapping surfaces as the shaft coaxially aligns the bearings; applying sufficient heat to said assemblies to at least partially hardened said thermo-setting material but insufficient to fluidize said fusible material while maintaining the previously established, fixed relations; and continuing the application of heat until said fusible material is caused to be removed in fluid form from the air gap to release the shaft and rotatable member for relative rotation with respect to the bearings, bearing support walls, and stationary assembly as said hardened material is cured whereby the cured material and bearing support assemblies permanently retain said previously established coaxial relation between the bearings and shaft and the predetermined air gap established between the stator and rotatable member for the operating life of the machine.

References Cited in the file of this patent

UNITED STATES PATENTS

| | | |
|---|---|---|
| 2,423,750 | Benson | July 8, 1947 |
| 2,531,334 | Grenat | Nov. 21, 1950 |
| 2,608,529 | Varian | Aug. 26, 1952 |
| 3,002,261 | Avila et al. | Oct. 3, 1961 |
| 3,043,147 | Will | July 10, 1962 |